(12) United States Patent
Zhou et al.

(10) Patent No.: US 11,038,657 B2
(45) Date of Patent: *Jun. 15, 2021

(54) METHOD AND APPARATUS FOR TRANSMITTING AND OBTAINING UPLINK HARQ FEEDBACK

(71) Applicant: BEIJING XIAOMI MOBILE SOFTWARE CO., LTD., Beijing (CN)

(72) Inventors: Juejia Zhou, Beijing (CN); Ming Zhang, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/348,786

(22) PCT Filed: Nov. 11, 2016

(86) PCT No.: PCT/CN2016/105498
§ 371 (c)(1),
(2) Date: May 9, 2019

(87) PCT Pub. No.: WO2018/086071
PCT Pub. Date: May 17, 2018

(65) Prior Publication Data
US 2020/0067678 A1    Feb. 27, 2020

(51) Int. Cl.
*H04L 5/00* (2006.01)
*H04L 1/18* (2006.01)
*H04W 72/04* (2009.01)

(52) U.S. Cl.
CPC .......... *H04L 5/0055* (2013.01); *H04L 1/1812* (2013.01); *H04W 72/0453* (2013.01)

(58) Field of Classification Search
None
See application file for complete search history.

(56) References Cited

U.S. PATENT DOCUMENTS

| | | | | |
|---|---|---|---|---|
| 6,389,034 B1* | 5/2002 | Guo | ...................... | H04B 7/264 370/441 |
| 8,369,427 B2* | 2/2013 | Kwon | ................. | H03M 13/353 375/260 |

(Continued)

FOREIGN PATENT DOCUMENTS

| CN | 102237992 A | 11/2011 |
|---|---|---|
| CN | 102469599 A | 5/2012 |

(Continued)

OTHER PUBLICATIONS

ISA State Intellectual Property Office of the People's Republic of China, International Search Report and Written Opinion issued in Application No. PCT/CN2016/105498, dated Jul. 28, 2017, WIPO, 7 pages.

(Continued)

*Primary Examiner* — Andrew C Oh
(74) *Attorney, Agent, or Firm* — Arch & Lake LLP

(57) ABSTRACT

The present disclosure provides methods and apparatuses for transmitting and obtaining uplink HARQ feedbacks. The method of transmitting uplink HARQ feedbacks includes: an ordered service priority list associated with downlink subframes are obtained; based on the ordered service priority list, one or more groups of to-be-sent HARQ feedbacks are obtained by multiplexing HARQ feedbacks associated with the downlink subframes in a descending order of service priorities; an uplink subframe is assigned successively to each of the one or more groups of the to-be-sent HARQ feedbacks so to transmit the to-be-sent HARQ feedbacks to a base station.

10 Claims, 11 Drawing Sheets

(56) References Cited

U.S. PATENT DOCUMENTS

| | | | |
|---|---|---|---|
| 2003/0137950 A1* | 7/2003 | Kim | H04W 52/265 370/318 |
| 2011/0268059 A1* | 11/2011 | Li | H04J 11/00 370/329 |
| 2013/0194924 A1* | 8/2013 | Zhang | H04W 28/10 370/232 |
| 2013/0235854 A1 | 9/2013 | Li | |
| 2013/0343336 A1* | 12/2013 | Bai | H04L 1/0086 370/329 |
| 2014/0269456 A1* | 9/2014 | Wang | H04W 72/082 370/280 |
| 2014/0369290 A1* | 12/2014 | Yang | H04L 5/0055 370/329 |
| 2015/0050930 A1* | 2/2015 | Seo | H04W 48/08 455/434 |
| 2015/0071212 A1* | 3/2015 | Kim | H04W 74/0833 370/329 |
| 2015/0092628 A1* | 4/2015 | Zhao | H04W 72/0413 370/280 |
| 2015/0215218 A1 | 7/2015 | Kanamarlapudi | |
| 2016/0119840 A1* | 4/2016 | Loehr | H04L 1/1822 370/331 |
| 2016/0226630 A1* | 8/2016 | Zhang | H04L 1/1861 |
| 2016/0242047 A1 | 8/2016 | Li | |
| 2016/0278050 A1* | 9/2016 | Nory | H04L 5/0053 |
| 2017/0013565 A1* | 1/2017 | Pelletier | H04W 52/365 |
| 2017/0019909 A1* | 1/2017 | Si | H04W 76/28 |
| 2017/0196020 A1* | 7/2017 | Mukherjee | H04W 74/004 |
| 2017/0303289 A1* | 10/2017 | Guo | H04W 52/367 |
| 2018/0013522 A1* | 1/2018 | Liu | H04L 5/0055 |
| 2018/0019851 A1* | 1/2018 | Takeda | H04W 72/042 |
| 2018/0048498 A1* | 2/2018 | Stern-Berkowitz | H04L 5/0048 |
| 2018/0262302 A1* | 9/2018 | Bergstrom | H04L 1/1812 |
| 2019/0280828 A1* | 9/2019 | Zhou | H04L 1/1864 |

FOREIGN PATENT DOCUMENTS

| | | |
|---|---|---|
| CN | 102647263 A | 8/2012 |
| WO | 2013155839 A1 | 10/2013 |

OTHER PUBLICATIONS

State Intellectual Property Office of the People's Republic of China, Office Action and Search Report Issued in Application No. 201680001456.7, dated Apr. 10, 2019, 13 pages, (Submitted with Machine Translation).

* cited by examiner

METHOD AND APPARATUS FOR TRANSMITTING AND OBTAINING UPLINK HARQ FEEDBACK

CROSS-REFERENCE TO RELATED APPLICATION

The present application is the U.S. national phase of PCT Application No. PCT/CN2016/105498 filed on Nov. 11, 2016, which is incorporated herein by reference in its entirety.

TECHNICAL FIELD

The present disclosure relates to the field of communication technology and more particular to methods and apparatuses for transmitting and obtaining uplink HARQ feedbacks.

BACKGROUND

With the development of wireless communication technologies, mobile communication networks are gradually evolving to 5G networks. The 5G network may configure more downlink service types based on user requirements and thus downlink subframes are configured more than uplink subframes in a Long Term Evolution Time Division Duplexing (LTE TDD) system of the 5G network. In a data transmission link, when user equipment sends Hybrid Automatic Repeat reQuest (HARQ) feedbacks to a base station, one uplink subframe for sending HARQ feedbacks is required to simultaneously report the HARQ feedbacks associated with a plurality of downlink subframes. The HARQ feedback includes an ACK signal or a NACK signal.

In the related art, the user equipment may multiplex a number of HARQ feedbacks associated with the number of the downlink subframes according to a receiving sequence of the downlink subframes, such that an uplink feedback resource in an uplink subframe may carry a preset multiplexing number of ACK or NACK signals and the preset multiplexing number of ACK or NACK signals are fed back to a base station at one time.

However, data with different service types may have different latency requirements. For example, an Ultra Reliable Low Latency Communication (URLLC) service is applied to a field with low latency such as internet of vehicles which requires high timeliness; and a massive Machine Type Communication (mMTC) service is usually insensitive to latency and data may be delivered in a relatively large time interval. With the method of transmitting uplink HARQ feedbacks in the related art, the timeliness of sending the HARQ feedback of a subframe with low latency may be affected, thereby affecting delivery of low-latency service data and affecting user experience.

SUMMARY

To solve the problems existing in the related art, examples of the present disclosure provide methods and apparatuses for transmitting and obtaining uplink HARQ feedbacks to preferentially transmit HARQ feedbacks of a subframe with low latency, thereby shortening delivery time of latency-sensitive service data.

According to a first aspect of examples of the present disclosure, a method of transmitting HARQ feedbacks is provided, which is applied in user equipment. The method includes:

obtaining an ordered service priority list associated with downlink subframes;

based on the ordered service priority list, obtaining one or more groups of to-be-sent HARQ feedbacks by multiplexing HARQ feedbacks associated with the downlink subframes in a descending order of service priorities;

successively assigning an uplink subframe to each of the one or more groups of the to-be-sent HARQ feedbacks so to transmit the to-be-sent HARQ feedbacks to a base station.

According to a second aspect of the present disclosure, a method of obtaining uplink HARQ feedbacks is provided, which is applied in a base station. The method includes:

determining service priorities associated with downlink subframes;

obtaining an ordered service priority list by sorting the service priorities associated with the downlink subframes in a preset priority order;

transmitting the ordered service priority list to user equipment, so that the user equipment is enabled to multiplex HARQ feedbacks associated with the downlink subframes based on the ordered service priority list and assign uplink subframes for multiplexed to-be-sent HARQ feedbacks; and receiving uplink HARQ feedbacks returned by the user equipment, and demultiplexing the uplink HARQ feedbacks based on the ordered service priority list and a preset multiplexing number.

According to a third aspect of examples of the present disclosure, an apparatus for transmitting uplink HARQ feedbacks configured in user equipment is provided and includes:

a sorting information obtaining module, configured to obtain an ordered service priority list associated with downlink subframes;

a multiplexing module, configured to obtain one or more groups of to-be-sent HARQ feedbacks by multiplexing HARQ feedbacks associated with the downlink subframes in a descending order of service priorities based on the ordered service priority list; and a transmitting module, configured to successively assign an uplink subframe to each of the one or more groups of the to-be-sent HARQ feedbacks so to transmit the to-be-sent HARQ feedbacks to a base station.

According to a fourth aspect of examples of the present disclosure, an apparatus of obtaining uplink HARQ feedbacks configured in a base station is provided and includes:

a priority determining module, configured to determine service priorities associated with downlink subframes;

a sorting module, configured to obtain an ordered service priority list by sorting the service priorities associated with the downlink subframes in a preset priority order;

a sorting information transmitting module, configured to transmit the ordered service priority list to user equipment, so that the user equipment is enabled to multiplex HARQ feedbacks associated with the downlink subframes based on the ordered service priority list and assign uplink subframes for multiplexed to-be-sent HARQ feedbacks; and a demultiplexing module, configured to receive uplink HARQ feedbacks returned by the user equipment and demultiplex the uplink HARQ feedbacks based on the ordered service priority list and a preset multiplexing number.

According to a fifth aspect of examples of the present disclosure, an apparatus for transmitting uplink HARQ feedbacks is provided and includes: a processor; and a memory for storing instructions executable by the processor;

where the processor is configured to:

obtain an ordered service priority list associated with downlink subframes;

based on the ordered service priority list, obtain one or more groups of to-be-sent HARQ feedbacks by multiplexing HARQ feedbacks associated with the downlink subframes in a descending order of service priorities; and successively assign an uplink subframe to each of the one or more groups of the to-be-sent HARQ feedbacks so to transmit the to-be-sent HARQ feedbacks to a base station.

According to a sixth aspect of aspects of the present disclosure, an apparatus for obtaining uplink HARQ feedbacks is provided and includes:

a processor; and a memory for storing instructions executable by the processor;

where the processor is configured to:

determine service priorities associated with downlink subframes;

obtain an ordered service priority list by sorting the service priorities associated with the downlink subframes in a preset priority order;

transmit the ordered service priority list to user equipment, so that the user equipment is enabled to multiplex HARQ feedbacks associated with the downlink subframes based on the ordered service priority list and assign uplink subframes for multiplexed to-be-sent HARQ feedbacks; and receive uplink HARQ feedbacks returned by the user equipment and demultiplex the uplink HARQ feedbacks based on the ordered service priority list and a preset multiplexing number.

The technical solutions provided by examples of the present disclosure may include the following benefits.

In the present disclosure, after obtaining the HARQ feedback associated with each downlink subframe, the user equipment may firstly obtain an ordered service priority list associated with each downlink subframe, then obtain to-be-sent HARQ feedbacks by multiplexing HARQ feedbacks associated with the downlink subframes in a descending order of service priorities, and successively assign uplink subframes for the to-be-sent HARQ feedbacks, such that the base station preferentially obtains the HARQ feedbacks associated with the downlink subframes with higher service priority, thereby preferentially determining whether to re-transmit latency-sensitive service data. In this way, the latency-sensitive service data is transmitted to the user equipment preferentially, thereby improving user experience of the latency-sensitive service.

In the present disclosure, the user equipment may receive the ordered service priority list associated with the downlink subframes within a preset time window from the base station in real time, and then multiplex the HARQ feedbacks based on the ordered service priority list. Since it is not required to perform data processing for service priority sorting, memory requirements of the user equipment may be reduced and data processing efficiency may be improved, thereby further shortening HARQ feedbacks latency.

In the present disclosure, the user equipment may also firstly determine a service priority associated with the respective downlink subframes based on a pre-stored preset priority classification list, and then sort the service priorities in a preset order to obtain the ordered service priority list as a reference basis for subsequent feedbacks multiplexing. Since the user equipment and the base station both store the same priority ordered list, the user equipment may sort service priorities after receiving downlink subframes, and does not need to wait for the base station to distribute the corresponding service priority ordered list. In this way, increasing control signaling overhead may be avoided, data transmission amount may be reduced, and data transmission channel resources may be saved.

In the present disclosure, during a process of sorting the service priorities, if a plurality of downlink subframes have a same service priority, especially when a number of the downlink subframes with the same service priority is greater than a preset multiplexing number, the subframe identifiers associated with the downlink subframes may be sorted based on a receiving sequence of the plurality of the downlink subframes. In this way, on the basis of preferentially transmitting the HARQ feedbacks with a higher priority, the sequence of transmitting the HARQ feedbacks may be guaranteed and the HARQ feedbacks associated with the latency-sensitive subframes may be transmitted reasonably.

In the present disclosure, when the HARQ feedbacks associated with respective downlink subframes are multiplexed based on the ordered service priority list, a preset multiplexing number of HARQ feedbacks associated with the preset multiplexing number of subframe identifiers may be successively multiplexed in a descending order of service priorities. The number of transmitting to-be-sent HARQ feedbacks may be reduced while the HARQ feedbacks with higher priorities is preferentially transmitted, thereby saving uplink resources.

In the present disclosure, the ordered service priority list including all subframe identifiers may be divided into a plurality of sub-lists based on service priorities, where each sub-list records the subframe identifiers with a same service priority. Then, the HARQ feedbacks associated with the subframe identifiers recorded in each sub-list are multiplexed based on a descending order of service priorities. When the number of subframe identifiers in a sub-list with a higher service priority is less than a preset multiplexing number, a nearest available uplink subframe may be assigned for the HARQ feedback associated with the subframe identifier separately, such that the HARQ feedbacks associated with the latency-sensitive subframes with a higher service priority may be preferentially transmitted to the base station, thereby ensuring that the user equipment may preferentially obtain the data of the latency-sensitive services.

In the present disclosure, when the HARQ feedbacks associated with the respective downlink subframes are multiplexed based on the ordered service priority list, classification multiplexing may be performed for the HARQ feedbacks associated with the downlink subframes with a preset priority, and sequence multiplexing may be performed for the HARQ feedbacks associated with the downlink subframes with remaining priorities in a descending order of service priorities based on a preset multiplexing number. It is guaranteed that the HARQ feedbacks associated with latency-sensitive subframes with a preset type may be preferentially transmitted to the base station. At same time, the HARQ feedbacks associated with subsequent latency-insensitive services may be prevented from occupying more uplink resources.

It is understood that the above general descriptions and the following detailed descriptions are merely illustrative and explanatory and are not intended to limit the present disclosure.

BRIEF DESCRIPTION OF DRAWINGS

The accompanying drawings, which are incorporated in and constitute a part of the present specification, illustrate examples coincident with the present disclosure and serve to explain the principles of the present disclosure together with the specification.

FIG. 5-1 is a schematic diagram illustrating assigned uplink subframes for HARQ feedbacks associated with downlink subframes in related art according to an example.

FIG. 5-2 is a schematic diagram illustrating assigned uplink subframes for HARQ feedbacks associated with downlink subframes according to an example of the present disclosure.

DETAILED DESCRIPTION OF THE EMBODIMENTS

Figure 1:
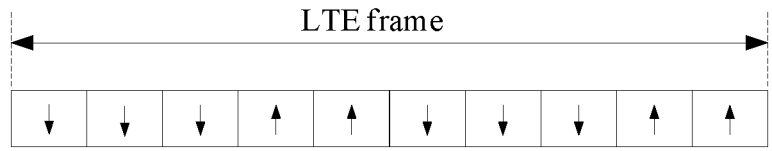
FIG. 1 is schematic diagram illustrating a structure of an LTE frame according to an example of the present disclosure.

Hereinafter, examples will be described in detail, examples of which are shown in the drawings. When the following descriptions refer to the drawings, the same numerals in the different drawings denote the same or similar elements unless otherwise indicated. The embodiments described in the following examples are not representative of all embodiments consistent with the present disclosure. Rather, they are merely examples of apparatuses and methods consistent with some aspects of the present disclosure as detailed in the appended claims.

The term used in the present disclosure is for the purpose of describing a particular example only, and is not intended to be limiting of the present disclosure. The singular forms such as "a", 'said", and "the" used in the present disclosure and the appended claims are also intended to include multiple, unless the context clearly indicates otherwise. It is also to be understood that the term "and/or" as used herein refers to any or all possible combinations that include one or more associated listed items.

It is to be understood that although different information may be described using the terms such as first, second, third, etc. in the present disclosure, such information should not be limited to these terms. These terms are used only to distinguish the same type of information from each other. For example, the first information may also be referred to as the second information without departing from the scope of the present disclosure, and similarly, the second information may also be referred to as the first information. Depending on the context, the word "if" as used herein may be interpreted as "when" or "as" or "in response to determining".

In an LTE TDD system, one frame in a data transmission link includes uplink subframes and downlink subframes. A structure of an LTE frame is shown in FIG. 1. One LTE frame is 10 ms and includes ten subframes. The subframe number is 0-9. As shown in FIG. 1, the subframe with arrow down indicates a downlink subframe and the subframe with arrow up indicates an uplink subframe. The downlink subframe is a subframe in which a base station transmits information to user equipment and the uplink subframe is a subframe in which the user equipment transmits information to the base station. FIG. 1 only exemplarily illustrates a ratio relationship in which a number of the downlink subframes is greater than a number of the uplink subframes. A specific ratio value shall not be interpreted as limiting of the present disclosure.

A HARQ mechanism of the present disclosure will be described below. In the HARQ transmission mechanism, after continuously sending several downlink subframes to the user equipment, the base station may pause and wait for receiving HARQ feedbacks sent by the user equipment. The user equipment will perform error detection for each received downlink subframe. If reception error does not occur, an acknowledgement (ACK) signal may be generated; and if reception error occurs, a negative-acknowledgement (NACK) signal may be generated. When the downlink resource is configured more than the uplink resource in the resource allocation, the user equipment may multiplex the above several HARQ feedbacks, i.e., ACK/NACK signals, to obtain to-be-sent HARQ feedbacks with multiple bits, and send the to-be-sent HARQ feedbacks with multiple bits to the base station through an assigned uplink feedback resource. If the base station receives the ACK signal, the base station may send a new downlink subframe to the user equipment. If the base station receives the NACK signal, the base station may re-transmit the downlink subframe which has been sent last time.

Based on this, a method of transmitting HARQ feedbacks is provided by the present disclosure, which may be applied to user equipment. The user equipment in the present disclosure may be any terminal with a mobile communication function, such as, a mobile phone, a tablet computer, a Personal Digital Assistant (PDA), and so on.

Figure 2:
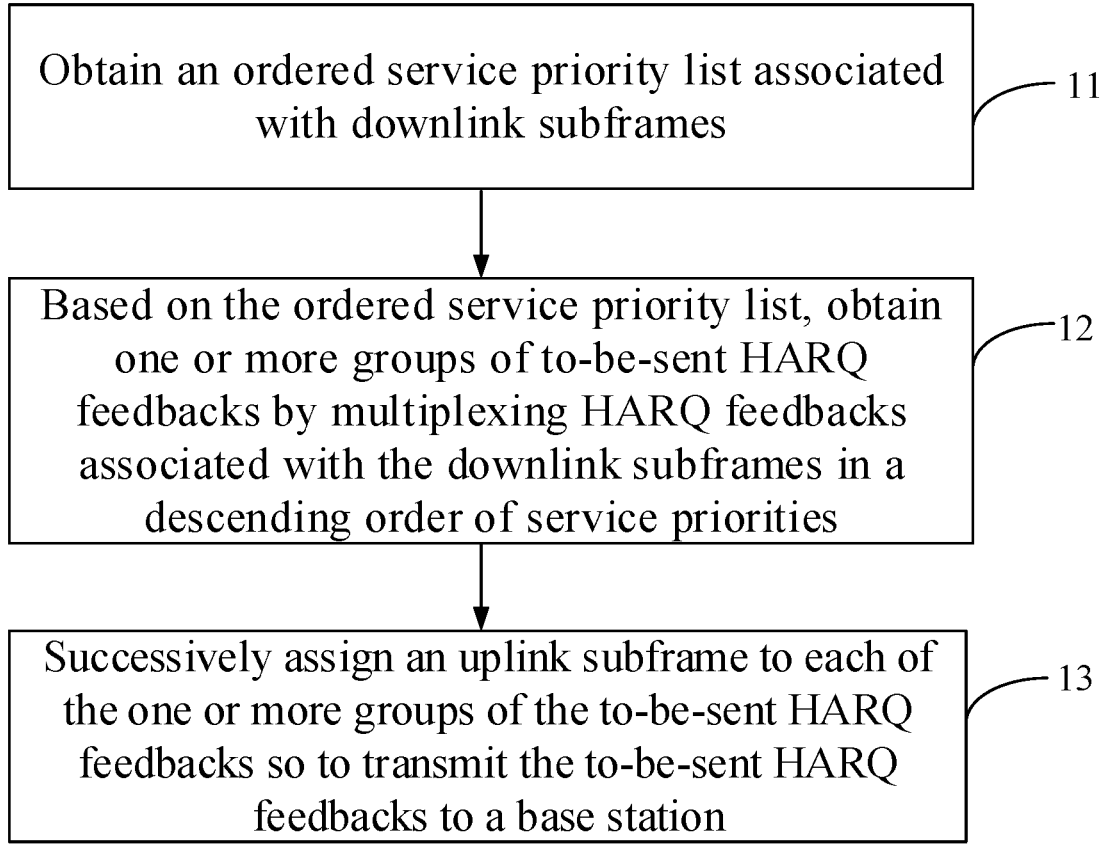
FIG. 2 is a flowchart illustrating a method of transmitting uplink HARQ feedbacks according to an example of the present disclosure.

FIG. 2 is a flowchart illustrating a method of transmitting HARQ feedbacks according to an example of the present disclosure. The method may include the following steps.

At step 11, an ordered service priority list associated with downlink subframes is obtained.

In an example of the present disclosure, a specific time window may be preset between the base station and the user equipment. The preset time window may refer to a time length in which the user equipment continuously receives a preset number of downlink subframes in the LTE TDD downlink. In the LTE TDD system, the length of the above preset time window may be represented by the preset number of subframes, such as, 2-9 subframes. In a specific implementation, the base station may assign the information of the specific time window in control signaling and send the control signaling to the user equipment.

The user equipment may obtain an ordered service priority list associated with downlink subframes after obtaining the downlink subframes within each preset time window.

Taking the preset time window including four downlink subframes as an example, when each time the user equipment receives four downlink subframes, an ordered service priority list associated with the four downlink subframes may be obtained. The ordered service priority list records sorted four subframe identifiers in a preset service priority order, such as, a descending order.

In examples of the present disclosure, the user equipment may obtain the ordered service priority list in the following manners.

In the first manner: the ordered service priority list associated with the downlink subframes within the preset time window is received from the base station.

Assuming that the base station sends four downlink subframes to the user equipment, each downlink subframe may carry information such as a subframe identifier, packet service data, a service type and so on. The base station may obtain the subframe identifier and the service type associated with each downlink subframe and then determine a service priority for each downlink subframe based on a preset priority classification list, where the preset priority classification list records a relationship between the service type and the service priority. Then the base station may obtain the ordered service priority list associated with the four downlink subframes by sorting the four subframe identifiers associated with the four downlink subframes based on a descending order of service priorities. The base station may transmit the ordered service priority list to the user equipment in real time. For example, the base station may assign the ordered service priority list associated with the four downlink subframes in unicast signaling and transmit the unicast signaling to the user equipment.

In the second manner: the user equipment may obtain the ordered service priority list associated with the downlink subframes based on pre-stored information of service priorities.

Figure 3:
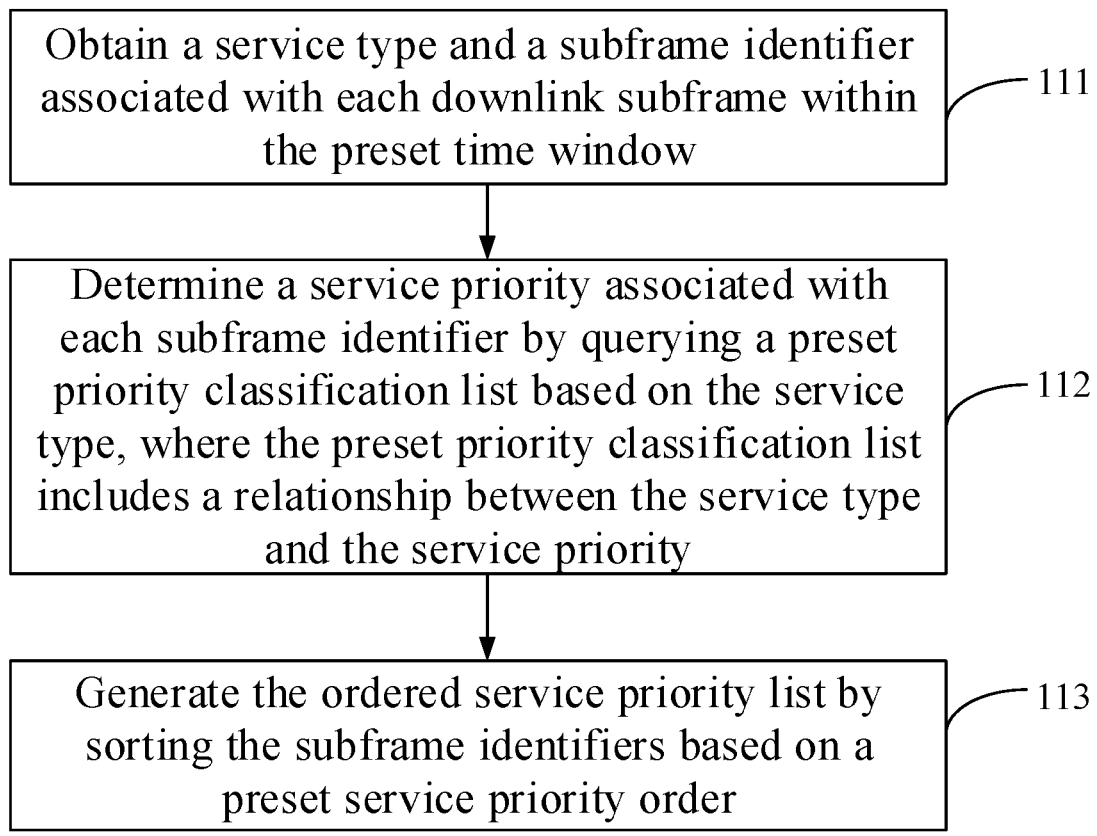
FIG. 3 is a flowchart illustrating a method of transmitting uplink HARQ feedbacks according to another example of the present disclosure.

FIG. 3 is a flowchart illustrating a method of transmitting uplink HARQ feedbacks according to an example of the present disclosure. Above step 11 may include:

at step 111, a service type and a subframe identifier associated with each downlink subframe within the preset time window are obtained.

The user equipment may obtain the subframe identifier and the service type associated with each downlink subframe by performing information extraction for each downlink subframe received within the preset time window. Still taking the above four downlink subframes within the preset time window as an example, it is assumed that the four subframe identifiers and corresponding service types are: subframe 0: mMTC service; subframe 1: URLLC service; subframe 2: URLLC service; and subframe 3: enhanced Mobile Broad Band (eMBB) service.

At step 112, a service priority associated with each subframe identifier is determined by querying a preset priority classification list based on the service type. The preset priority classification list includes a relationship between the service type and the service priority.

In the present disclosure, the preset priority classification list may be a priority determination basis pre-agreed between the base station and the user equipment.

In an example, the priority classification list may be general, that is, all user equipment may determine the service priorities associated with the received downlink subframes based on the priority classification list. After determining the preset priority classification list, the base station may assign the priority classification list in broadcast signaling and send the broadcast signaling to all user equipment in a cell.

In another example, the preset priority classification list may also be a priority classification list for a certain class of user equipment or a certain piece of user equipment. For example, if the user equipment is mMTC equipment, the mMTC service type in the priority classification list may be set to the highest priority. A relationship between equipment information of the user equipment and the priority classification list may be pre-stored in the base station, so that the base station may analyse the multiplexed HARQ feedbacks sent by the user equipment subsequently.

In an example of the present disclosure, it is assumed that the above preset priority classification list is shown in Table 1.

TABLE 1

| Service type | Service priority |
| --- | --- |
| URLLC | First priority |
| mMTC | Second priority |
| eMBB | Third priority |

According to Table 1, the service priorities of the four downlink subframes may be determined as follows: subframe 0: second priority; subframe 1: first priority; subframe 2: first priority; and subframe 3: third priority.

It is noted that the above Table 1 merely illustrates that one service priority corresponds to one service type. In another example of the present disclosure, one service priority may correspond to two or more service types when assigning the priority classification list. For example, if there are a plurality of latency-sensitive service types, the plurality of latency-sensitive service types may correspond to the first priority when assigning the priority classification list.

At step 113, the ordered service priority list is generated by sorting the subframe identifiers based on a preset service priority order.

The preset service priority order may be a descending order or an ascending order. Taking the descending order as an example, if the first priority is the highest service priority, as shown in Table 2, the ordered service priority list may be obtained by sorting the four subframe identifiers associated with the above four downlink subframes in the descending order of service priorities.

TABLE 2

| Subframe identifier | Service priority |
| --- | --- |
| 1 | First priority |
| 2 | First priority |
| 0 | Second priority |
| 3 | Third priority |

Further, when a plurality of subframes within a preset time window have a same service priority, especially, in a case that a number of the subframe identifiers with a same priority is greater than a preset multiplexing number, the subframe identifiers may be sorted based on a receiving sequence of the subframes with the same priority. For example, assuming that the preset time window includes five downlink subframes, a fifth downlink subframe is included on the basis of the above example. The relationship between the subframe identifier and the service type associated with the downlink subframe may be: subframe 4: URLLC service. In the LTE TDD system, a receiving sequence of the five downlink subframes may be as follows: 0, 1, 2, 3, and 4. If the entire list is sorted based on a descending order of service priorities, three subframe identifiers with the same priority, that is, the first priority, may be sorted as follows: 1, 2, and 4. The corresponding ordered service priority list may be shown in Table 3.

TABLE 3

| Subframe identifier | Service priority |
| --- | --- |
| 1 | First priority |
| 2 | First priority |
| 4 | First priority |
| 0 | Second priority |
| 3 | Third priority |

At step 12, based on the ordered service priority list, one or more groups of to-be-sent HARQ feedbacks are obtained by multiplexing HARQ feedbacks associated with the downlink subframes in a descending order of service priorities. Each group of to-be-sent HARQ feedbacks may include the preset multiplexing number of correspondences between the subframe identifier and the HARQ feedback; or include the preset multiplexing number of HARQ feedbacks in the descending order of service priorities.

According to the related art, the user equipment may generate a corresponding HARQ feedback, such as an ACK signal or a NACK signal, by performing error detection for each received downlink subframe. Multiplexing the HARQ feedbacks associated with the downlink subframes refers to obtaining a group of to-be-sent HARQ feedbacks by multiplexing the HARQ feedback, i.e., the ACK signal or the NACK signal, associated with the respective subframe identifiers based on the preset multiplexing number. The group of to-be-sent HARQ feedbacks is transmitted to the base station through one uplink subframe, thereby saving uplink feedback resource.

After the user equipment performs error detection for the five downlink subframes recorded in Table 3, it is assumed that the generated HARQ feedbacks are respectively as follows: subframe 0: ACK; subframe 1: ACK; subframe 2: NACK; subframe 3: NACK; and subframe 4: ACK. In combination with the above Table 3 and the HARQ feedback associated with each subframe, a to-be-multiplexed list may be generated, as shown in Table 4.

TABLE 4

| Subframe identifier | Service priority | HARQ feedback |
| --- | --- | --- |
| 1 | First priority | ACK |
| 2 | First priority | NACK |
| 4 | First priority | ACK |
| 0 | Second priority | ACK |
| 3 | Third priority | NACK |

In the present disclosure, after the to-be-multiplexed list is determined, the HARQ feedbacks associated with the downlink subframes may be multiplexed in the following manners.

In the first manner: based on the ordered service priority list, the HARQ feedbacks associated with a preset multiplexing number of subframe identifiers are successively multiplexed in a descending order of service priorities. In examples of the present disclosure, the preset multiplexing number is an integer greater than or equal to 2, generally no more than 4.

Assuming that the preset multiplexing number pre-agreed between the base station and the user equipment is 2, based on the above Table 4, at first, the HARQ feedbacks associated with the subframe 1 and the subframe 2 are multiplexed to obtain a group of to-be-sent HARQ feedbacks, where the group of to-be-sent HARQ feedbacks may include: subframe 1: ACK, and subframe 2: NACK; or include: ACK and NACK. Then, the HARQ feedbacks associated with the subframe 4 and the subframe 0 are multiplexed to obtain another group of to-be-sent HARQ feedbacks, where, another group of to-be-sent HARQ feedbacks may include: subframe 4: ACK, and subframe 0: NACK. The HARQ feedback associated with the subframe 3 is not multiplexed and as a single group of to-be-sent HARQ feedback.

Figure 4:
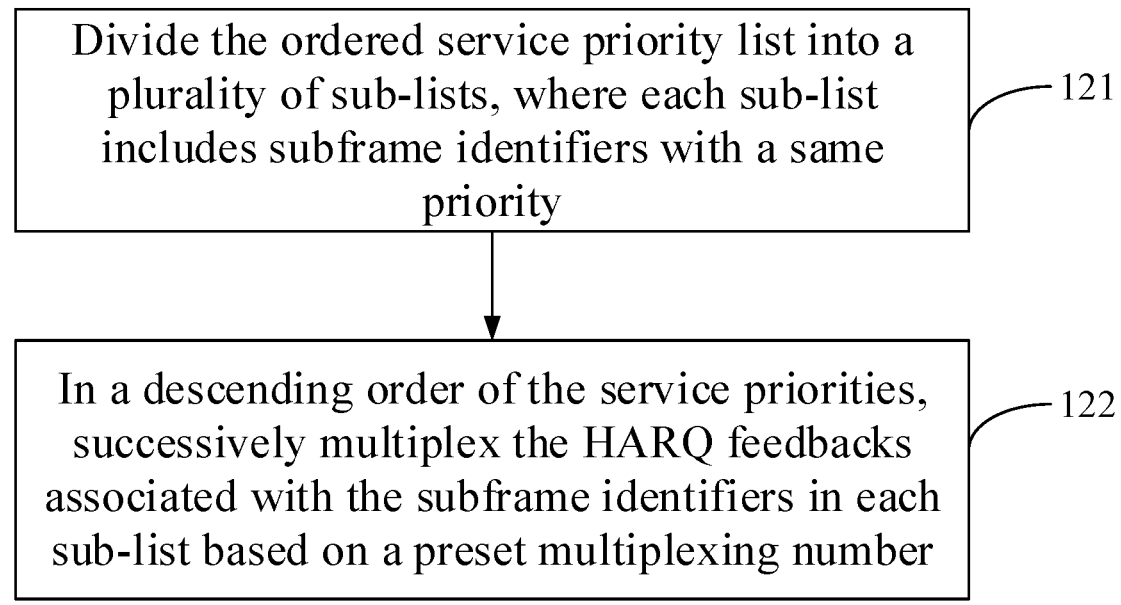
FIG. 4 is a flowchart illustrating a method of transmitting uplink HARQ feedbacks according to another example of the present disclosure.

In the second manner: based on a descending order of service priorities, classification multiplexing is performed for the HARQ feedbacks with different priorities. FIG. 4 is a flowchart illustrating a method of transmitting uplink HARQ feedbacks according to another example of the present disclosure. The above step 12 may include:

At step 121, the ordered service priority list may be divided into a plurality of sub-lists, where each sub-list includes subframe identifiers with a same priority.

Still taking the above Table 3 as an example, the Table 3 may be divided into three sub-lists based on respective service priorities. As shown in Table 3-1, the first sub-list corresponds to the first priority.

TABLE 3-1

| Subframe identifier | Service priority |
|---|---|
| 1 | First priority |
| 2 | First priority |
| 4 | First priority |

As shown in Table 3-2, the second sub-list corresponds to the second priority.

TABLE 3-2

| Subframe identifier | Service priority |
|---|---|
| 0 | Second priority |

As shown in Table 3-3, the third sub-list corresponds to the third priority.

TABLE 3-3

| Subframe identifier | Service priority |
|---|---|
| 3 | Third priority |

At step 122, in a descending order of service priorities, the HARQ feedbacks associated with the subframe identifiers in each sub-list are successively multiplexed based on a preset multiplexing number.

Still taking the preset multiplexing number being 2 as an example, a process of multiplexing the HARQ feedbacks associated with the downlink subframes recorded in the above three sub-lists is described below.

The HARQ feedbacks associated with the subframe 1 and the subframe 2 in the first sub-list are multiplexed to obtain a group of to-be-sent HARQ feedbacks. The HARQ feedback associated with the subframe 4 is not multiplexed. Since the number of the subframe identifier in the second sub-list and the number of the subframe identifier in the third sub-list are both less than the preset multiplexing number, the HARQ feedback associated with the subframe 0 and HARQ feedback associated with the subframe 3 are not multiplexed.

In the third manner: classification multiplexing is performed for the HARQ feedbacks associated with the downlink subframes with a preset priority, and sequence multiplexing is performed for the HARQ feedbacks associated with the downlink subframes with remaining priorities.

Still taking the preset multiplexing number being 2 as an example, the base station and the user equipment agree to perform classification multiplexing for the HARQ feedbacks associated with the subframe identifiers with the first priority. Based on the above to-be-multiplexed Table 4, at first, the HARQ feedbacks associated with the subframe 1 and the subframe 2 are multiplexed to obtain one group of to-be-sent HARQ feedbacks, which is represented as subframe 1: ACK and subframe 2: NACK. The HARQ feedback associated with the subframe 4 is not multiplexed. Then the HARQ feedbacks associated with the subframe 0 and the subframe 3 are multiplexed to obtain another group of to-be-sent HARQ feedbacks, which is represented as subframe 0: ACK and subframe 3: NACK.

At step 13, an uplink subframe is successively assigned to each of the one or more groups of the to-be-sent HARQ feedbacks so to transmit the to-be-sent HARQ feedbacks to a base station.

Uplink subframes are successively assigned to the groups of the to-be-sent HARQ feedbacks, where the assigned uplink subframe is a nearest uplink subframe available for sending a group of the HARQ feedbacks.

Figures 1, 5:
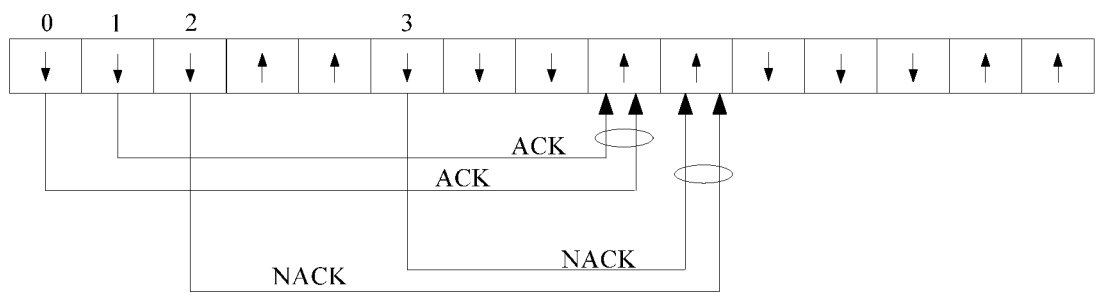
Figures 2, 5:
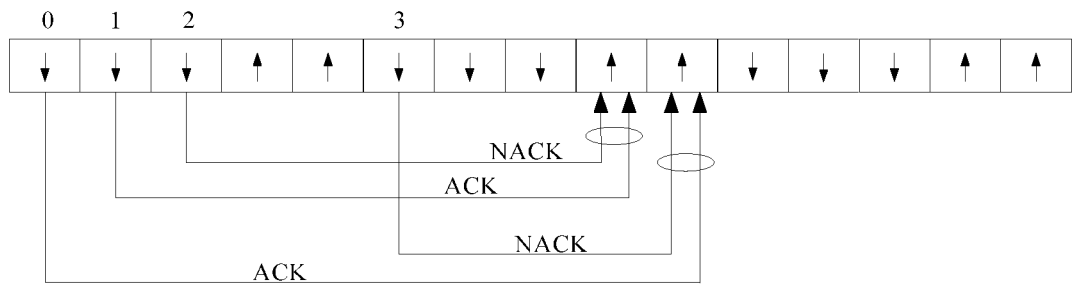

FIG. 5-1 is a schematic diagram illustrating assigned uplink subframes for HARQ feedbacks associated with downlink subframes recorded in Table 2 according to the related art. Based on a receiving sequence, HARQ feedbacks associated with every two downlink subframes are multiplexed, and then an available nearest uplink subframe is assigned for the multiplexed HARQ feedbacks with two bits. That is, at first, an uplink subframe is assigned for one group of HARQ feedbacks multiplexed by the downlink subframes 0 and 1, and then, an uplink subframe is assigned for another group of HARQ feedbacks multiplexed by the downlink subframes 2 and 3.

FIG. 5-2 is a schematic diagram illustrating assigned uplink subframes for HARQ feedbacks associated with downlink subframes recorded in Table 2 according to an example of the present disclosure. The HARQ feedbacks associated with the subframes 1 and 2 having the highest service priorities are multiplexed at first, and a nearest uplink subframe is assigned for one group of multiplexed to-be-sent HARQ feedbacks. Then the HARQ feedbacks associated with the subframes 0 and 3 having lower service priorities are multiplexed according to the above first multiplexing manner, and an uplink subframe is assigned for another group of multiplexed to-be-sent HARQ feedbacks.

By comparing FIG. 5-2 with FIG. 5-1, with the method of transmitting HARQ feedbacks provided by examples of the present disclosure, the HARQ feedbacks with higher service priorities may preferentially occupy the uplink subframes for transmitting HARQ feedbacks. Therefore, service data with higher latency requirements may be preferentially delivered to the user equipment and user experience may be improved.

Figure 6:
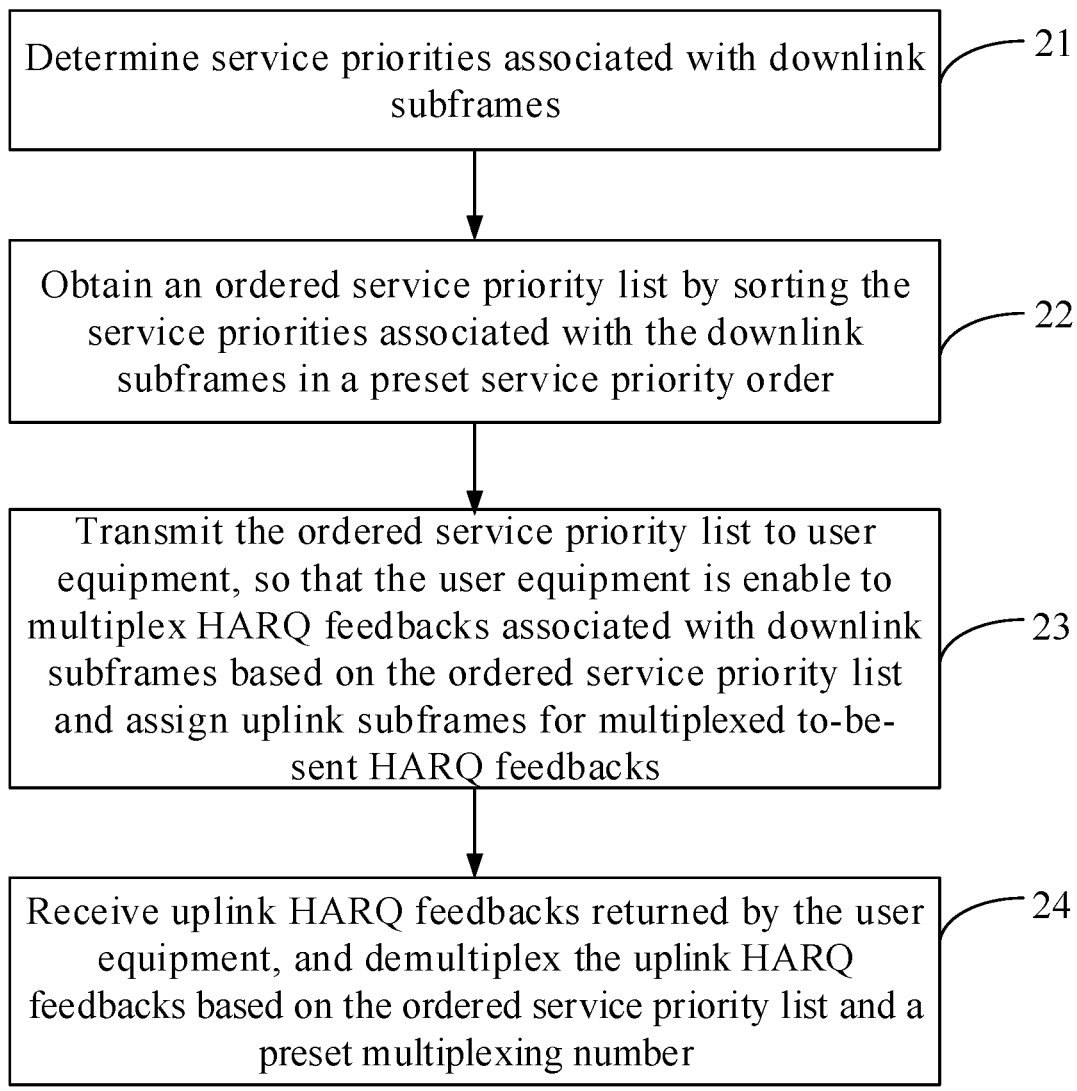
FIG. 6 is a flowchart illustrating a method of obtaining uplink HARQ feedbacks according to an example of the present disclosure.

Correspondingly, the present disclosure also provides a method of obtaining uplink HARQ feedbacks, which may be applied to a base station. FIG. 6 is a flowchart illustrating a method of obtaining uplink HARQ feedbacks according to an example of the present disclosure. The method may include the following steps.

At step 21, service priorities associated with downlink subframes are determined.

Figure 7:
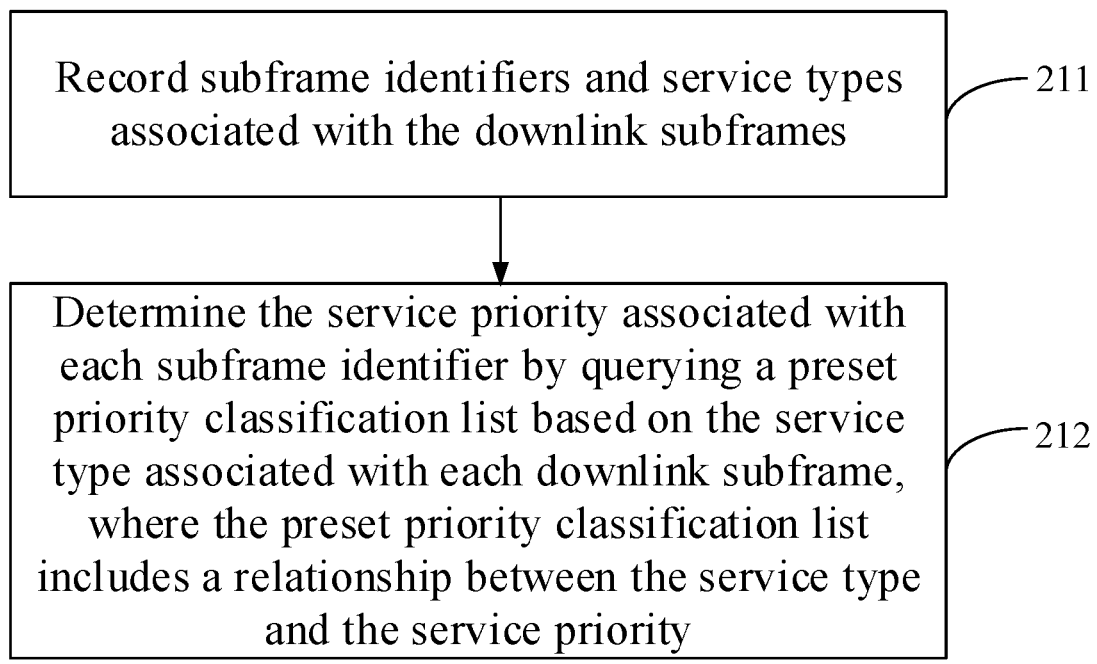
FIG. 7 is a flowchart illustrating a method of obtaining uplink HARQ feedbacks according to another example of the present disclosure.

Specifically, FIG. 7 is a flowchart illustrating a method of obtaining uplink HARQ feedbacks according to another example of the present disclosure. The step 21 may include:

at step 211, subframe identifiers and service types associated with downlink subframes are recorded.

In the present disclosure, the base station may record subframe identifiers and service types associated with downlink subframes within a preset time window that are sent to a certain piece of user equipment.

At step 212, the service priority associated with each subframe identifier is determined by querying a preset priority classification list based on the service type associated with each downlink subframe, where the preset priority classification list includes a relationship between the service type and the service priority.

Figure 8:
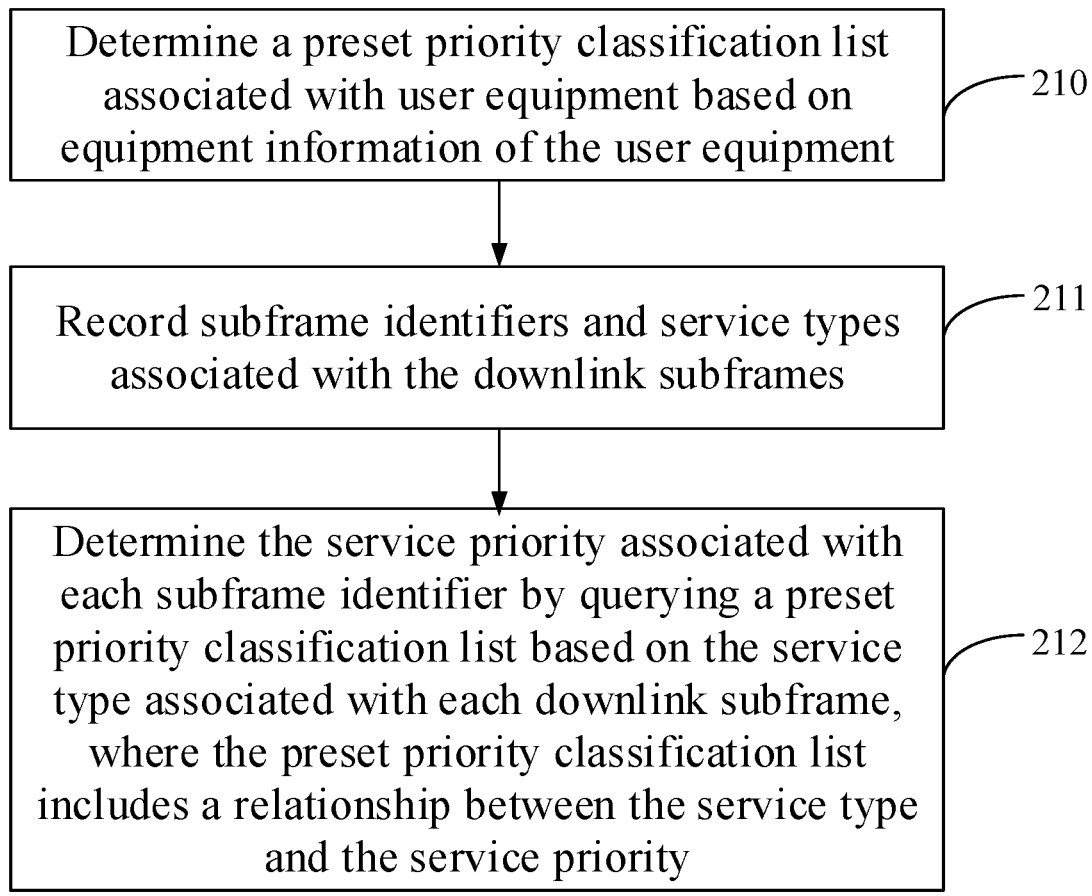
FIG. 8 is a flowchart illustrating a method of obtaining uplink HARQ feedbacks according to another example of the present disclosure.

FIG. 8 is a flowchart illustrating a method of obtaining uplink HARQ feedbacks according to another example of the present disclosure. Before the above step 211, the step 21 may also include:

at step 210, the preset priority classification list associated with user equipment is determined based on equipment information of the user equipment, where the equipment information of the user equipment may be an equipment type or an identifier of the user equipment.

In an example, priority classification lists associated with different types of user equipment may be pre-stored in a mobile communication network server associated with a base station, or in a more personalized manner, a priority classification list associated with each user equipment may be pre-stored. As an example, an eMTC service type may be configured to the highest priority, i.e., the first priority, in a priority classification list associated with eMTC type user equipment. The preset priority classification list may be a list sent to the base station for storing after the user equipment performs priority configuration and storage. The preset priority classification lists determined by examples of the present disclosure may meet personalized requirements of different user equipment.

At step 22, an ordered service priority list is obtained by sorting the service priorities associated with the downlink subframes in a preset service priority order.

The preset service priority order may be a descending order or an ascending order.

In the present disclosure, after the service priority associated with each downlink subframe is determined, the ordered service priority list associated with the downlink subframes may be obtained by sorting the subframe identifiers associated with respective downlink subframes in a descending order of service priorities. The ordered service priority list may include a relationship between the service priority and the subframe identifier, which are sorted in a descending order of service priorities, as shown in the above Table 2 or Table 3.

In another example of the present disclosure, the ordered service priority list may only include subframe identifiers associated with to-be-multiplexed feedbacks. As mentioned above, the priorities of the four downlink subframes within the preset time window may be determined as follows: subframe 0: second priority; subframe 1: first priority; subframe 2: first priority; and subframe 3: third priority. In a case that the preset multiplexing number is 2, the base station may obtain an ordered service priority list including only two subframe identifiers based on the priorities, as shown in Table 5.

TABLE 5

| Subframe identifier | Service priority |
| --- | --- |
| 1 | First priority |
| 2 | First priority |

The base station may transmit the ordered service priority list shown in Table 5 to user equipment through control signalling in real time. Compared with the ordered service priority list including all subframe identifiers shown in the above Table 2, this ordered service priority list includes less information and does not affect subsequent feedback multiplexing, thereby saving channel resources.

At step 23, the ordered service priority list is transmitted to user equipment, so that the user equipment is enabled to multiplex HARQ feedbacks associated with downlink subframes based on the ordered service priority list and assign uplink subframe for multiplexed to-be-sent HARQ feedbacks.

At step 24, uplink HARQ feedbacks returned by the user equipment are received, and the uplink HARQ feedbacks are demultiplexed based on the ordered service priority list and a preset multiplexing number.

Since the base station and the user equipment pre-agree with a multiplexing number and store the same ordered service priority list, the base station may determine whether an HARQ feedback belongs to a multiplexed feedback after receiving the HARQ feedback from the user equipment. If yes, the HARQ feedbacks associated with which downlink subframes may be determined based on the ordered service priority list, so as to determine that which downlink subframe needs to be re-transmitted.

For example, for four downlink subframes: subframe 0: mMTC service; subframe 1: URLLC service; subframe 2: URLLC service; and subframe 3: eMBB service, the ordered service priority list determined by the base station is shown in Table 2. The preset multiplexing number is 2. When receiving HARQ feedbacks, the base station determines that the HARQ feedback associated with the subframe 1 is ACK and the HARQ feedback associated with the subframe 2 is NACK. The base station may determine that the subframe 2 needs to be re-transmitted.

For subsequently received feedbacks, which subframe to be re-transmitted may be determined based on the pre-agreed feedback multiplexing manners. For example, for the first multiplexing manner at the above step 12, after receiving a second group of HARQ feedbacks, the base station may determine that the HARQ feedback associated with the subframe 0 is ACK and the HARQ feedback associated with the subframe 3 is NACK. The downlink subframe 3 is re-transmitted. For the second multiplexing manner at the above step 12, the base station receives the HARQ feedbacks with one bit in turn, which are the HARQ feedback associated with the subframe 0 and the HARQ feedback associated with the subframe 3 respectively. The base station determines that the corresponding downlink subframe needs to be re-transmitted according to the received HARQ feedback being the ACK signal or the NACK signal.

For simplicity of descriptions, examples of above methods are expressed as a series of action combinations. However, those skilled in the art shall understand that the present disclosure is not limited by the described action sequence, because certain steps may be performed in other sequence or concurrently according to the present disclosure.

Secondly, those skilled in the art shall understand that the examples described in the specification are all optional examples, and the actions or modules involved are not necessarily required by the present disclosure.

Corresponding to the above examples of the methods, the present disclosure also provides examples of apparatuses to implement the application function and a corresponding terminal.

Figure 9:
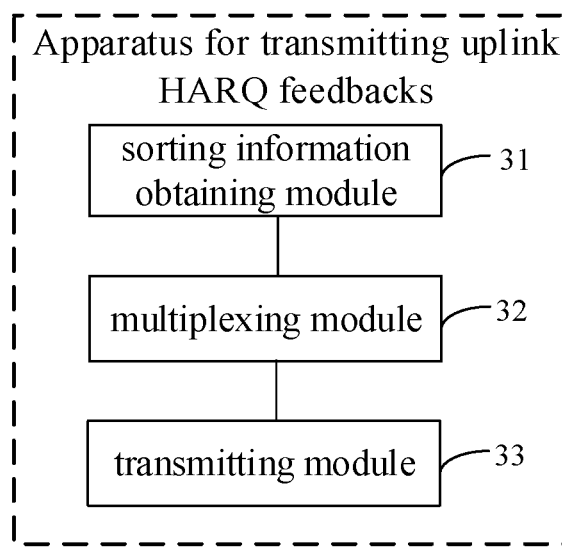
FIG. 9 is a block diagram illustrating an apparatus for transmitting uplink HARQ feedbacks according to an example of the present disclosure.

FIG. 9 is a block diagram illustrating an apparatus for transmitting uplink HARQ feedbacks according to an example of the present disclosure, which may be applied in user equipment. The apparatus may include:

a sorting information obtaining module 31, configured to obtain an ordered service priority list associated with downlink subframes;

a multiplexing module 32, configured to obtain one or more groups of to-be-sent HARQ feedbacks by multiplexing HARQ feedbacks associated with the downlink subframes in a descending order of service priorities based on the ordered service priority list; and a transmitting module 33, configured to successively assign an uplink subframe to each of the one or more groups of the to-be-sent HARQ feedbacks so as to transmit the to-be-sent HARQ feedbacks to a base station.

Figure 10:
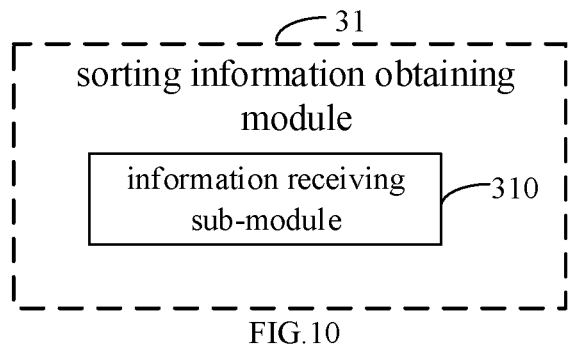
FIG. 10 is a block diagram illustrating an apparatus for transmitting uplink HARQ feedbacks according to another example of the present disclosure.

FIG. 10 is a block diagram illustrating an apparatus for transmitting uplink HARQ feedbacks according to another example of the present disclosure. On the basis of the example of FIG. 9, the sorting information obtaining module 31 may include:
- an information receiving sub-module 310, configured to receive the ordered service priority list associated with the downlink subframes within a preset time window from the base station, where the ordered service priority list includes subframe identifiers sorted based on a preset service priority order.

Figure 11:
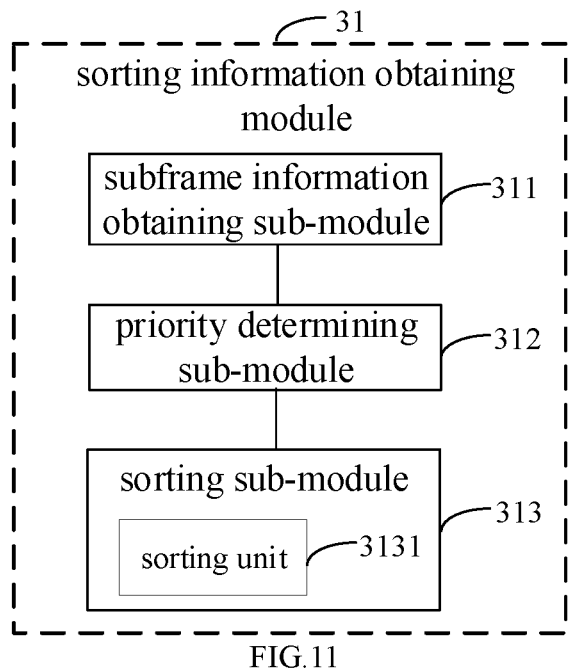
FIG. 11 is a block diagram illustrating an apparatus for transmitting uplink HARQ feedbacks according to another example of the present disclosure.

FIG. 11 is a block diagram illustrating an apparatus for transmitting uplink HARQ feedbacks according to another example of the present disclosure. On the basis of the example of FIG. 9, the sorting information obtaining module 31 may include:
- a subframe information obtaining sub-module 311, configured to obtain a service type and a subframe identifier associated with each downlink subframe within a preset time window;
- a priority determining sub-module 312, configured to determine a service priority associated with each subframe identifier by querying a preset priority classification list based on the service type, where the preset priority classification list includes a relationship between the service type and the service priority; and
- a sorting sub-module 313, configured to generate the ordered service priority list by sorting the subframe identifiers based on a preset service priority order.

In another example of the present disclosure, the sorting sub-module 313 may specifically include:
- a sorting unit 3131, configured to sort the subframe identifiers with a same priority based on a receiving sequence of the downlink subframes in a case that a number of the subframe identifiers with the same priority is greater than a preset multiplexing number.

Figure 12:
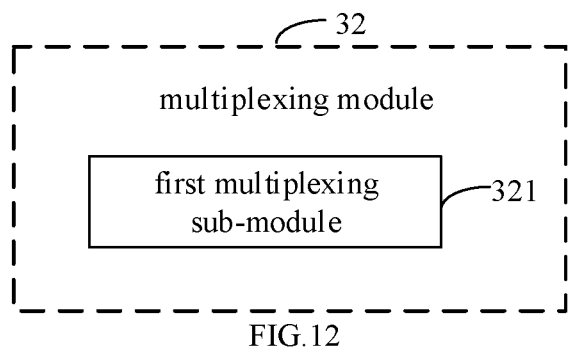
FIG. 12 is a block diagram illustrating an apparatus for transmitting uplink HARQ feedbacks according to another example of the present disclosure.

FIG. 12 is a block diagram illustrating an apparatus for transmitting uplink HARQ feedbacks according to another example of the present disclosure. On the basis of the example of FIG. 9, the multiplexing module 32 may include:
- a first multiplexing sub-module 321, configured to successively multiplex a preset multiplexing number of HARQ feedbacks associated with the preset multiplexing number of subframe identifiers in the descending order of service priorities based on the ordered service priority list.

Figure 13:
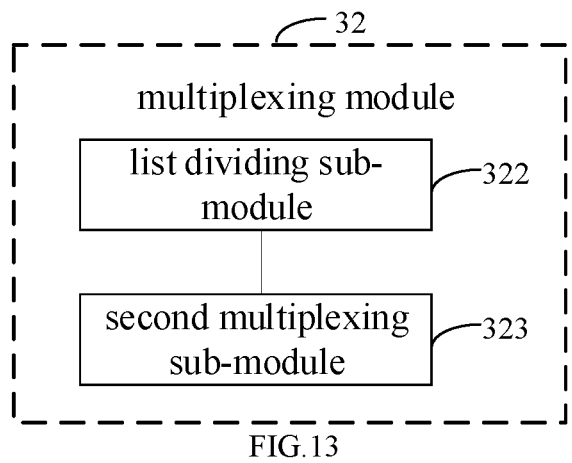
FIG. 13 is a block diagram illustrating an apparatus for transmitting uplink HARQ feedbacks according to another example of the present disclosure.

FIG. 13 is a block diagram illustrating an apparatus for transmitting uplink HARQ feedbacks according to another example of the present disclosure. On the basis of the example of FIG. 9, the multiplexing module 32 may include:
- a list dividing sub-module 322, configured to divide the ordered service priority list into a plurality of sub-lists, where each sub-list includes subframe identifiers with a same priority; and
- a second multiplexing sub-module 323, configured to successively multiplex the HARQ feedbacks associated with the subframe identifiers in each sub-list in the descending order of service priorities based on a preset multiplexing number.

Figure 14:
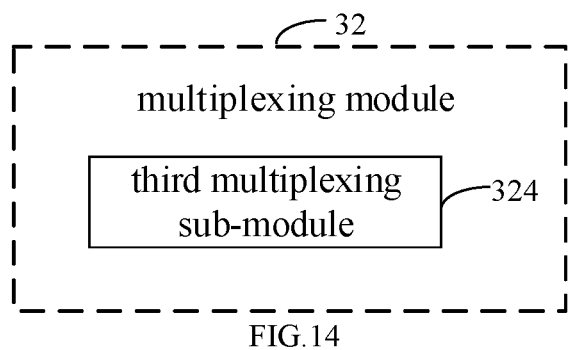
FIG. 14 is a block diagram illustrating an apparatus for transmitting uplink HARQ feedbacks according to another example of the present disclosure.

FIG. 14 is a block diagram illustrating an apparatus for transmitting uplink HARQ feedbacks according to another example of the present disclosure. On the basis of the example of FIG. 9, the multiplexing module 32 may include:
- a third multiplexing sub-module 324, configured to, based on the service priorities and a preset multiplexing number, perform classification multiplexing for the HARQ feedbacks associated with the downlink subframes with a preset priority, and perform sequence multiplexing for the HARQ feedbacks associated with the downlink subframes with remaining priorities.

Figure 15:
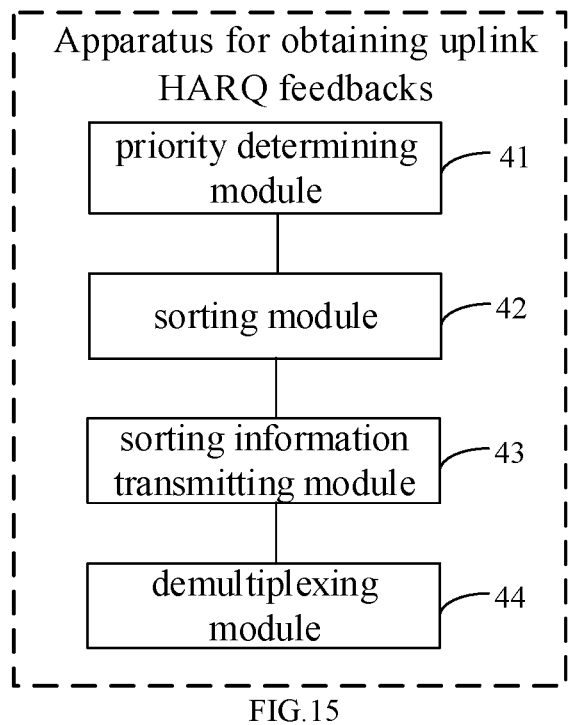
FIG. 15 is a block diagram illustrating an apparatus for obtaining uplink HARQ feedbacks according to an example of the present disclosure.

Correspondingly, FIG. 15 is a block diagram illustrating an apparatus for obtaining uplink HARQ feedbacks according to an example of the present disclosure, which may be applied in a base station. The apparatus may include:
- a priority determining module 41, configured to determine service priorities associated with downlink subframes;
- a sorting module 42, configured to obtain an ordered service priority list by sorting the service priorities associated with the downlink subframes in a preset priority order;
- a sorting information transmitting module 43, configured to transmit the ordered service priority list to user equipment, so that the user equipment is enabled to multiplex HARQ feedbacks associated with the downlink subframes based on the ordered service priority list and assign uplink subframes for multiplexed to-be-sent HARQ feedbacks; and
- a demultiplexing module 44, configured to receive uplink HARQ feedbacks returned by the user equipment and demultiplex the uplink HARQ feedbacks based on the ordered service priority list and a preset multiplexing number.

Figure 16:
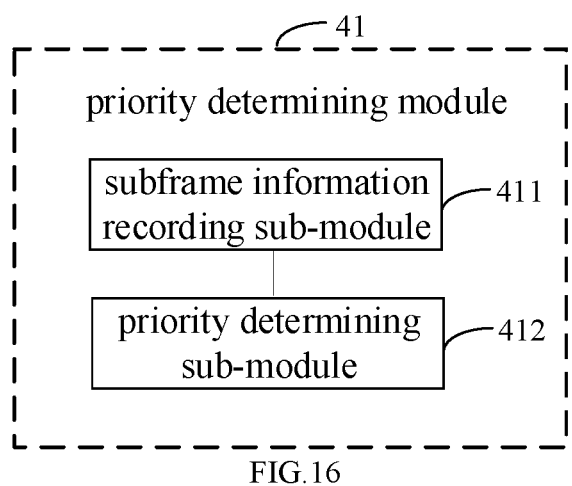
FIG. 16 is a block diagram illustrating an apparatus for obtaining uplink HARQ feedbacks according to another example of the present disclosure.

FIG. 16 is a block diagram illustrating an apparatus for obtaining uplink HARQ feedbacks according to an example of the present disclosure. On the basis of the example of FIG. 15, the priority determining module 41 may include:
- a subframe information recording sub-module 411, configured to record subframe identifiers and service types associated with the downlink subframes; and
- a priority determining sub-module 412, configured to determine the service priority associated with each subframe identifier by querying a preset priority classification list based on the service type associated with each downlink subframe, where the preset priority classification list includes a relationship between the service type and the service priority.

Figure 17:
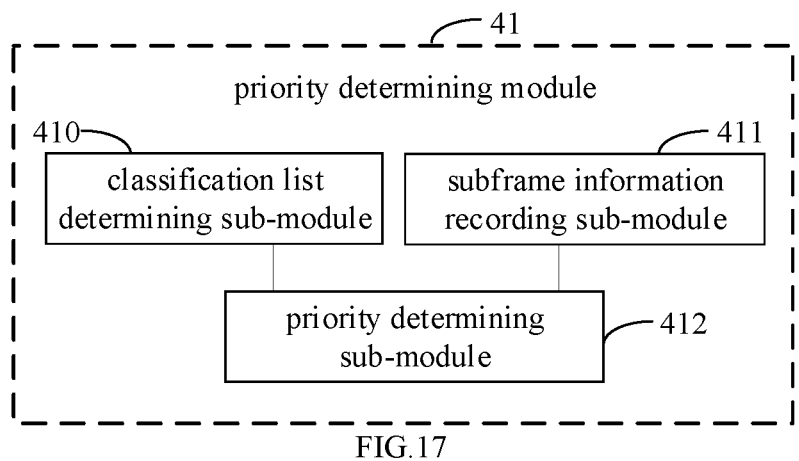
FIG. 17 is a block diagram illustrating an apparatus for obtaining uplink HARQ feedbacks according to another example of the present disclosure.

FIG. 17 is a block diagram illustrating an apparatus for obtaining uplink HARQ feedbacks according to an example of the present disclosure. On the basis of the example of FIG. 16, the priority determining module 41 may further include:
- a classification list determining sub-module 410, configured to determine the preset priority classification list associated with the user equipment based on equipment information of the user equipment. For the apparatuses in the examples, the specific manners of executing operations by different modules are already detailed in the examples of relevant methods, which will not be repeated herein.

Correspondingly, on one hand, the present disclosure provides an apparatus for transmitting uplink HARQ feedbacks, which may be applied to user equipment. The apparatus may include a processor, and a memory storing instructions executable by the processor. The processor may be configured to:
- obtain an ordered service priority list associated with downlink subframes;
- based on the ordered service priority list, obtain one or more groups of to-be-sent HARQ feedbacks by multiplexing HARQ feedbacks associated with the downlink subframes in a descending order of service priorities; and successively assign an uplink subframe to each of the one or more groups of the to-be-sent HARQ feedbacks so to transmit the to-be-sent HARQ feedbacks to a base station.

On the other hand, the present disclosure provides an apparatus for obtaining uplink HARQ feedbacks, which may be applied to a base station. The apparatus may include a processor and a memory for storing instructions executable by the processor. The processor is configured to:

determine service priorities associated with downlink subframes;

obtain an ordered service priority list by sorting the service priorities associated with the downlink subframes in a preset priority order;

transmit the ordered service priority list to user equipment, so that the user equipment is enabled to multiplex HARQ feedbacks associated with the downlink subframes based on the ordered service priority list and assign uplink subframes for multiplexed to-be-sent HARQ feedbacks;

receive uplink HARQ feedbacks returned by the user equipment; and demultiplex the uplink HARQ feedbacks based on the ordered service priority list and a preset multiplexing number.

Figure 18:
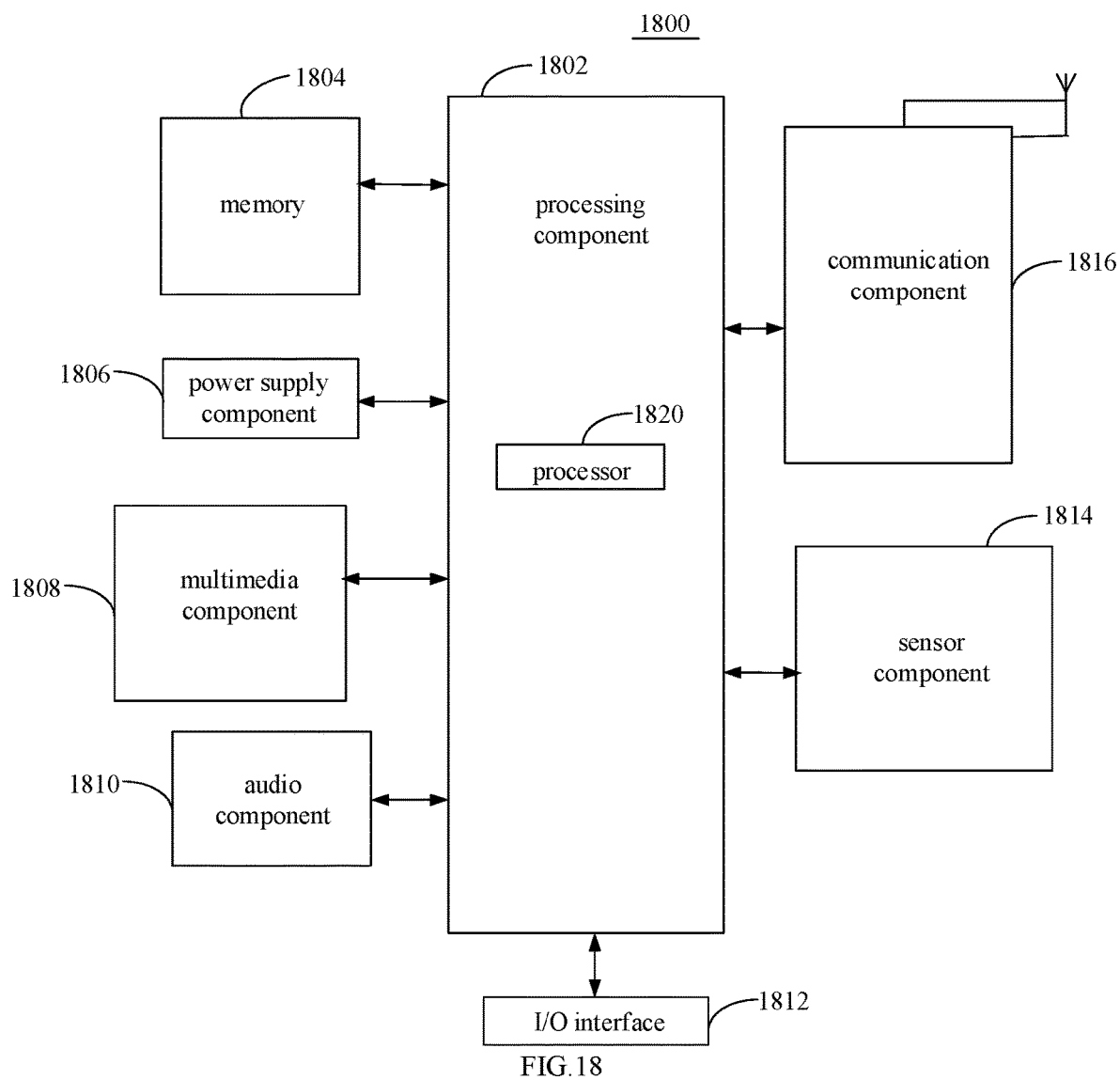
FIG. 18 is a structural diagram illustrating an apparatus for transmitting uplink HARQ feedbacks according to an example of the present disclosure.

FIG. 18 is a structural diagram illustrating apparatus 1800 for transmitting uplink HARQ feedbacks according to an example of the present disclosure. For example, the apparatus 1800 may be a terminal, and may specifically be a mobile phone, a computer, a digital broadcast terminal, a message transceiver, a game console, a tablet device, a medical device, a fitness device, a personal digital assistant, and a wearable device such as a smart watch, smart glasses, a smart wristband, and smart running shoes.

As shown in FIG. 18, the apparatus 1800 may include one or more of the following components: a processing component 1802, a memory 1804, a power supply component 1806, a multimedia component 1808, an audio component 1810, an input/output (I/O) interface 1812, a sensor component 1814 and a communication component 1816.

The processing component 1802 generally controls overall operations of the apparatus 1800, such as operations associated with display, phone calls, data communications, camera operations, and recording operations. The processing component 1802 may include one or more processors 1820 for executing instructions to complete all or a part of steps of the above method. In addition, the processing component 1802 may include one or more modules which facilitate the interaction between the processing component 1802 and other components. For example, the processing component 1802 may include a multimedia module to facilitate the interaction between the multimedia component 1808 and the processing component 1802.

The memory 1804 may be configured to store various types of data to support the operation of the apparatus 1800. Examples of such data include instructions for any application or method operated on the apparatus 1800, contact data, phonebook data, messages, pictures, videos, and so on. The memory 1804 may be implemented by any type of volatile or non-volatile memory devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic, or compact disk.

The power supply component 1806 may provide power to different components of the apparatus 1800. The power supply component 1806 may include a power management system, one or more power supplies and other components associated with generating, managing, and distributing power for the apparatus 1800.

The multimedia component 1808 may include a screen providing an output interface between the apparatus 1800 and a user. In some examples, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a duration and a pressure associated with the touch or swipe. In some examples, the multimedia component 1808 may include a front camera and/or a rear camera. The front camera and/or rear camera may receive external multimedia data when the apparatus 1800 is in an operating mode, such as a photographing mode or a video mode. Each of the front camera and the rear camera may be a fixed optical lens system or have focal length and optical zooming capability.

The audio component 1810 may be configured to output and/or input an audio signal. For example, the audio component 1810 may include a microphone (MIC) configured to receive an external audio signal when the apparatus 1800 is in an operating mode, such as a call mode, a recording mode, and a voice recognition mode. The received audio signal may be further stored in the memory 1804 or sent via the communication component 1816. In some examples, the audio component 1810 further includes a speaker to output an audio signal.

The I/O interface 1812 provides an interface between the processing component 1802 and peripheral interface modules. The above peripheral interface modules may be a keyboard, a click wheel, buttons, and so on. These buttons may include, but are not limited to, a home button, a volume button, a starting button, and a locking button.

The sensor component 1814 may include one or more sensors to provide status assessments of various aspects for the apparatus 1800. For example, the sensor component 1814 may detect an on/off state of the apparatus 1800, and relative positioning of component, for example, the component is a display and a mini-keypad of the apparatus 1800. The sensor component 1814 may also detect a change in position of the apparatus 1800 or a component of the apparatus 1800, a presence or absence of the contact between a user and the apparatus 1800, an orientation or an acceleration/deceleration of the apparatus 1800, and a change in temperature of the apparatus 1800. The sensor component 1814 may include a proximity sensor configured to detect the presence of a nearby object without any physical contact. The sensor component 1814 may further include an optical sensor, such as a CMOS or CCD image sensor which is used in imaging applications. In some examples, the sensor component 1814 may further include an acceleration sensor, a gyroscope sensor, a magnetic sensor, a pressure sensor, or a temperature sensor.

The communication component 1816 may be configured to facilitate wired or wireless communication between the apparatus 1800 and other devices. The apparatus 1800 may access a wireless network that is based on a communication standard, such as Wi-Fi, 2G, 3G or a combination thereof. In an example, the communication component 1816 receives broadcast signals or broadcast-associated information from an external broadcast management system via a broadcast channel. In an example, the communication component 1816 further includes a Near Field Communication (NFC) module to facilitate short-range communications. For example, the NFC module may be implemented based on a Radio Frequency Identification (RFID) technology, an Infrared Data Association (IrDA) technology, an Ultra Wideband (UWB) technology, a Bluetooth® (BT) technology and other technologies.

In an example, the apparatus 1800 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronic components for performing the above method.

In an example, there is also provided a non-transitory machine-readable storage medium including instructions, such as a memory 1804 including instructions. The above instructions may be executed by the processor 1820 of the apparatus 1800 to perform the above method. For example, the non-transitory machine-readable storage medium may be a ROM, a RAM, a CD-ROM, a magnetic tape, a floppy disk, and an optical data storage device and so on.

Figure 19:
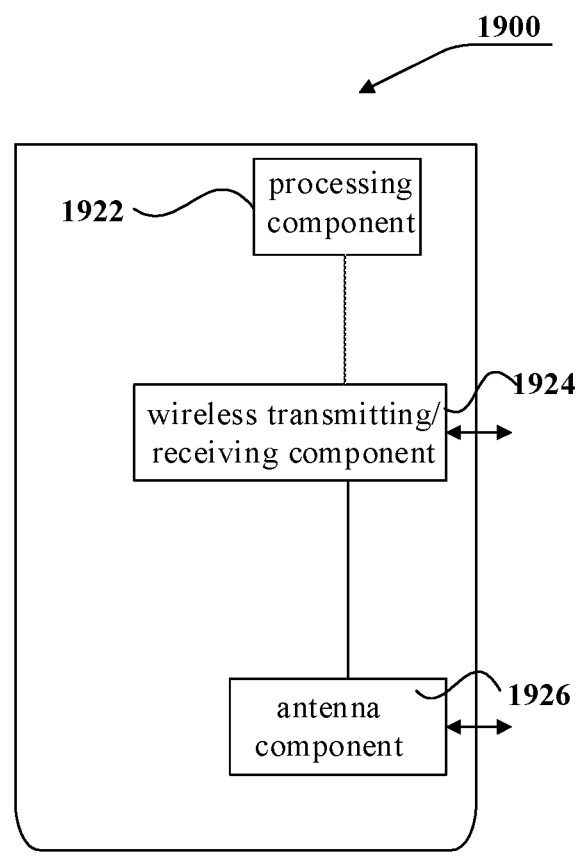
FIG. 19 is a structural diagram illustrating an apparatus for obtaining uplink HARQ feedbacks according to an example of the present disclosure.

FIG. 19 is a structural diagram illustrating an apparatus 1900 for obtaining uplink HARQ feedbacks according to an example of the present disclosure. The apparatus 1900 may be a base station. As shown in FIG. 19, the apparatus 1900 may include a processing component 1922, a wireless transmitting/receiving component 1924, an antenna component 1926 and a signal processing part unique to a wireless interface. The processing component 1922 may further include one or more processors.

One processor of the processing component 1922 may be configured to:
  determine service priorities associated with downlink subframes;
  obtain an ordered service priority list by sorting the service priorities associated with the downlink subframes in a preset priority order;
  transmit the ordered service priority list to user equipment, so that the user equipment is enabled to multiplex HARQ feedbacks associated with the downlink subframes based on the ordered service priority list and assign uplink subframes for multiplexed to-be-sent HARQ feedbacks;
  receive uplink HARQ feedbacks returned by the user equipment; and
  demultiplex the uplink HARQ feedbacks based on the ordered service priority list and a preset multiplexing number.

Other implementations of the present disclosure will be apparent to those skilled in the art from consideration of the specification and practice of the present disclosure herein. The present disclosure is intended to cover any variations, usages, or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

The invention claimed is:

1. A method of transmitting uplink hybrid automatic repeat request (HARQ) feedbacks, the method being applied to user equipment, comprising:
  obtaining an ordered service priority list associated with downlink subframes, further comprising:
    for each downlink subframe within a preset time window, obtaining a service type and a subframe identifier associated with the downlink subframe;
    determining a service priority associated with the subframe identifier by querying a preset priority classification list based on the service type, wherein the preset priority classification list comprises a relationship between the service type and the service priority; and
  generating the ordered service priority list by sorting the subframe identifiers based on a preset service priority order, comprising:
    in a case that a number of the subframe identifiers with a same priority is greater than a preset multiplexing number, sorting the subframe identifiers with the same priority based on a receiving sequence of the downlink subframes;
  based on the ordered service priority list, obtaining one or more groups of to-be-sent HARQ feedbacks by multiplexing HARQ feedbacks associated with the downlink subframes in a descending order of service priorities; and
  successively assigning an uplink subframe to each of the one or more groups of the to-be-sent HARQ feedbacks and transmitting the to-be-sent HARQ feedbacks to a base station.

2. The method of claim 1, wherein obtaining the ordered service priority list associated with the downlink subframes comprises:
  receiving the ordered service priority list associated with the downlink subframes within the preset time window from the base station, wherein the ordered service priority list comprises subframe identifiers sorted based on the preset service priority order.

3. The method of claim 1, wherein multiplexing the HARQ feedbacks associated with the downlink subframes in the descending order of service priorities based on the ordered service priority list comprises:
  based on the ordered service priority list, successively multiplexing the preset multiplexing number of HARQ feedbacks associated with the preset multiplexing number of subframe identifiers in the descending order of service priorities.

4. The method of claim 1, wherein multiplexing the HARQ feedbacks associated with the downlink subframes in the descending order of service priorities based on the ordered service priority list comprises:
  dividing the ordered service priority list into a plurality of sub-lists, wherein each sub-list comprises subframe identifiers with a same priority; and
  in the descending order of service priorities, successively multiplexing the HARQ feedbacks associated with the subframe identifiers in each sub-list based on the preset multiplexing number.

5. The method of claim 1, wherein multiplexing the HARQ feedbacks associated with the downlink subframes in the descending order of service priorities based on the ordered service priority list comprises:
  based on the service priorities and the preset multiplexing number, performing classification multiplexing for the HARQ feedbacks associated with the downlink subframes with a preset priority, and performing sequence multiplexing for the HARQ feedbacks associated with the downlink subframes with remaining priorities.

6. An apparatus for transmitting uplink HARQ feedbacks, comprising:
a processor; and
a memory for storing instructions executable by the processor;
wherein the processor is configured to:
obtain an ordered service priority list associated with downlink subframes, further comprising:
for each downlink subframe within a preset time window,
obtaining a service type and a subframe identifier associated with the downlink subframe;
determining a service priority associated with the subframe identifier by querying a preset priority classification list based on the service type, wherein the preset priority classification list comprises a relationship between the service type and the service priority; and
generating the ordered service priority list by sorting the subframe identifiers based on a preset service priority order, comprising:
in a case that a number of the subframe identifiers with a same priority is greater than a preset multiplexing number, sorting the subframe identifiers with the same priority based on a receiving sequence of the downlink subframes;
based on the ordered service priority list, obtain one or more groups of to-be-sent HARQ feedbacks by multiplexing HARQ feedbacks associated with the downlink subframes in a descending order of service priorities; and
successively assign an uplink subframe to each of the one or more groups of the to-be-sent HARQ feedbacks and transmit the to-be-sent HARQ feedbacks to a base station.

7. The apparatus of claim 6, wherein obtaining the ordered service priority list associated with the downlink subframes comprises:
receiving the ordered service priority list associated with the downlink subframes within the preset time window from the base station, wherein the ordered service priority list comprises subframe identifiers sorted based on the preset service priority order.

8. The apparatus of claim 6, wherein multiplexing the HARQ feedbacks associated with the downlink subframes in the descending order of service priorities based on the ordered service priority list comprises:
based on the ordered service priority list, successively multiplexing the preset multiplexing number of HARQ feedbacks associated with the preset multiplexing number of subframe identifiers in the descending order of service priorities.

9. The apparatus of claim 6, wherein multiplexing the HARQ feedbacks associated with the downlink subframes in the descending order of service priorities based on the ordered service priority list comprises:
dividing the ordered service priority list into a plurality of sub-lists, wherein each sub-list comprises subframe identifiers with a same priority; and
in the descending order of service priorities, successively multiplexing the HARQ feedbacks associated with the subframe identifiers in each sub-list based on the preset multiplexing number.

10. The apparatus of claim 6, wherein multiplexing the HARQ feedbacks associated with the downlink subframes in the descending order of service priorities based on the ordered service priority list comprises:
based on the service priorities and the preset multiplexing number, performing classification multiplexing for the HARQ feedbacks associated with the downlink subframes with a preset priority, and performing sequence multiplexing for the HARQ feedbacks associated with the downlink subframes with remaining priorities.

* * * * *